US007461642B2

(12) United States Patent
Bircann et al.

(10) Patent No.: US 7,461,642 B2
(45) Date of Patent: Dec. 9, 2008

(54) ROTARY-ACTUATED EXHAUST GAS RECIRCULATION VALVE HAVING A SEATING FORCE ATTENUATOR

(75) Inventors: Raul A. Bircann, Penfield, NY (US); Joshua M. Haines, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 11 days.

(21) Appl. No.: 11/332,082

(22) Filed: Jan. 13, 2006

(65) Prior Publication Data

US 2007/0163554 A1 Jul. 19, 2007

(51) Int. Cl.

*F02M 25/07* (2006.01)
*F02B 47/08* (2006.01)
*F16K 1/32* (2006.01)
*F01L 1/30* (2006.01)

(52) U.S. Cl. .............................. 123/568.23; 123/188.8; 123/568.11; 251/129.11; 251/319; 251/333

(58) Field of Classification Search ... 123/188.1–188.4, 123/188.8, 188.11, 568.11, 568.31, 568.23, 123/568.21, 568.24; 251/129.11, 318, 319, 251/333, 334

See application file for complete search history.

(56) References Cited

U.S. PATENT DOCUMENTS

| | | | | | |
|---|---|---|---|---|---|
| 1,342,419 | A * | 6/1920 | Brenner | .................. | 123/188.8 |
| 1,501,036 | A * | 7/1924 | Boyle | ...................... | 123/188.3 |
| 3,282,285 | A * | 11/1966 | Hanson et al. | ........... | 137/116.5 |
| 3,319,420 | A * | 5/1967 | Mercier | ....................... | 138/30 |
| 6,729,351 | B2 * | 5/2004 | Bircann et al. | ......... | 137/630.14 |
| 6,886,546 | B1 * | 5/2005 | Bircann et al. | ......... | 123/568.23 |

* cited by examiner

*Primary Examiner*—Willis R Wolfe, Jr.
(74) *Attorney, Agent, or Firm*—Paul L. Marshall

(57) ABSTRACT

Means for attenuating the seating force of a cam-actuated poppet valve such as an exhaust gas recirculation valve in an internal combustion engine including a shock-absorber disposed between the valve stem and valve head. In a currently preferred embodiment, the shock-absorber is a wave washer disposed around the valve stem and captured between the valve stem and the valve head, between which axial motion is allowed. After the valve head engages the valve seat to close the valve, any further travel of the actuator cam and valve stem is absorbed by compression of the wave washer, thus attenuating additional force on elements of the valve actuation train. In opening the valve, the reverse occurs, in that initial motion of the actuator cam and valve stem serves to relieve compression of the wave washer, followed by removal of the valve head from the valve seat.

20 Claims, 3 Drawing Sheets

ROTARY-ACTUATED EXHAUST GAS RECIRCULATION VALVE HAVING A SEATING FORCE ATTENUATOR

TECHNICAL FIELD

The present invention relates to exhaust gas recirculation (EGR) valves for internal combustion engines; more particularly, to EGR valves having a poppet valve stem actuated by a rotary cam; and most particularly, to such an EGR valve wherein the valve seating force between the valve head and the valve seat is attenuated by a mechanical shock-absorbing mechanism disposed between the valve stem and the valve head.

BACKGROUND OF THE INVENTION

Recirculation of exhaust gas into the air intake stream of an internal combustion engine is well known, both for spark-ignited (SI) engines and for compression-ignited (CI) engines. Such recirculation requires a rugged, dependable, precision valve, typically a poppet valve, disposed in a cross-over between an engine's exhaust system and intake system. In many prior art automotive uses, an EGR poppet valve is actuated by a linear solenoid attached to the valve stem. However, a rotary cam driven by an electric motor is also a well known actuation means, especially for diesel-powered automotive applications in Europe. Such usage is expected to become more prevalent world wide.

For ease of presentation, the terms "rotary cam" and "rotary EGR valve" as employed herebelow should be taken to mean any arrangement wherein the linear action of the valve stem is controlled by the rotary motion of an eccentric coupled in some fashion to the valve stem.

Rotary EGR valves have become especially popular because of the generally high force margins they enjoy over other designs, and particularly because of inherent significant mechanical advantages through gearing and camming. Typically, this genre of valves is actuated in both opening and closing directions, as well as in parked (closed) position during engine operation when EGR flow may not be desired.

A disadvantage of such actuation is inherently high and sustained forces imposed on the valve actuation train that can prove detrimental for long-term wear, including grooving of the valve head, wear of the valve seat, and degradation of the interface between the cam and its roller follower on the valve stem. Such wear can result in high break-loose forces and "kinking", leading to poor controllability in the just off-parked position.

Of course, these considerations pertain not only to rotary EGR valves but also to all poppet valves actuated by powerful actuators, whether rotary cams or linear solenoids.

What is required is a means for attenuating the seating force of a poppet valve without compromising the timing or the closing reliability of the valve.

It is a principal object of the present invention to attenuate the seating force of a poppet valve.

SUMMARY OF THE INVENTION

Briefly described, means for attenuating the seating force of a poppet valve comprises a shock-absorbing member disposed in the poppet between the valve stem and valve head. In a currently preferred embodiment, the shock-absorbing member is a wave washer disposed around the valve stem and captured between the valve stem and the valve head, between which axial motion is allowed. After the valve head engages the valve seat to close the valve, any further travel of the actuator is absorbed by compression of the wave washer, thus attenuating additional force on elements of the valve actuation train. In opening the valve, the reverse occurs in that initial motion of the actuator serves to relieve compression of the wave washer, followed then by removal of the valve head from the valve seat.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate two currently-preferred embodiments of the invention, and such exemplifications are not to be construed as limiting the scope of the invention in any manner.

DESCRIPTION OF THE PREFERRED EMBODIMENTS

Figure 1:
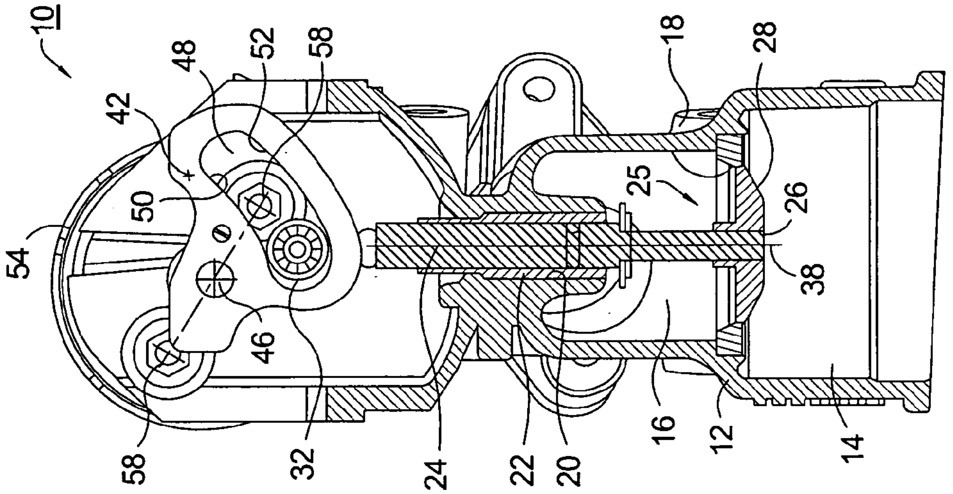
FIG. 1. (PRIOR ART)
FIG. 1 is a front elevational cross-sectional view of a prior art cam-actuated poppet valve.
Figure 2:
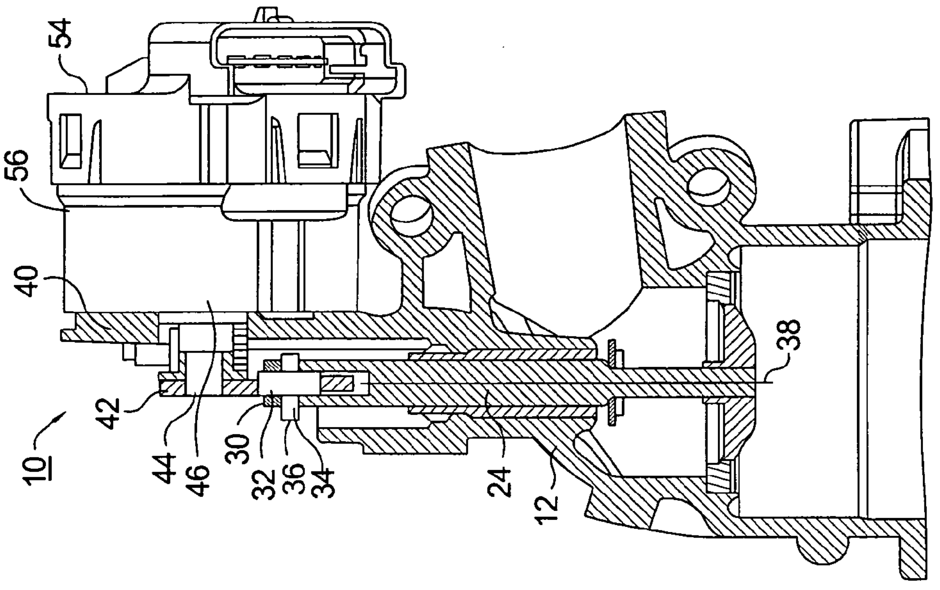
FIG. 2. (PRIOR ART)
FIG. 2 is a side elevational cross-sectional view of the prior art valve shown in FIG. 1.

Referring to FIGS. 1 and 2, a prior art poppet valve assembly 10 suitable for use as an EGR valve comprises a valve body 12 defining a first chamber 14 and a second chamber 16 separated by a valve seat 18. A bore 20 in a wall of second chamber 16 is concentric with valve seat 18 and retains a bushing/seal 22 and a valve stem 24 of a poppet valve 25 slidably disposed in bushing/seal 22. Stem 24 extends through second chamber 16 and fixedly supports, at a first end 26 within body 12, a valve head 28 for variably mating with valve seat 18 to variably open and close valve 10 between chambers 14,16 in response to axial motion of stem 24. At a second stem end 30 outside of body 12, stem 24 is provided with a roller 32 mounted on a first shaft 34 extending from stem 24 and having an axis 36 orthogonal to axis 38 of stem 24. A bracket 40 extending from body 12 supports a cam plate 42 mounted on a second shaft 44 extending from bracket 40 and also having an axis 46 orthogonal to, but preferably not intersective of, axis 38 of stem 24. Cam plate 42 includes a slot 48 having first and second slot sides 50,52 spaced apart by a distance substantially equal to the diameter of roller 32 which is disposed within slot 48. Slot sides 50,52 spiral about axis 46. An electric motor 54 and optionally a gear transmission 56 is bolted to bracket 40 by bolts 58 such that second shaft 44 is, or is an extension of, the shaft of motor/transmission 54. It is seen that clockwise rotation of cam plate 42 about axis 46 by motor 54 from the valve-closed position shown in FIG. 1 causes stem 24 to be moved linearly in a direction toward first chamber 14, thus lifting valve head 28 from seat 18 and thereby opening valve assembly 10 between first and second chambers 14,16. Counterclockwise rotation of cam plate 42 causes valve assembly 10 to be closed.

It will be observed that slot side 50 drives roller 32 in valve-opening mode and slot side 52 drives roller 32 in valve-closing mode. Motor 54 may be de-energized at any point in the rotary travel of cam plate 42, locking the valve stem at that position.

As described above, when the cam plate is driven to the valve-closed position, from the moment that the valve head mates with the valve seat, compressive force of the head against the seat and tensile force between the head and the roller and slot side 52 can become extremely large, and ultimately damaging, with continued rotation of the cam plate because the valve actuation train is mechanically unyielding.

Figure 3:
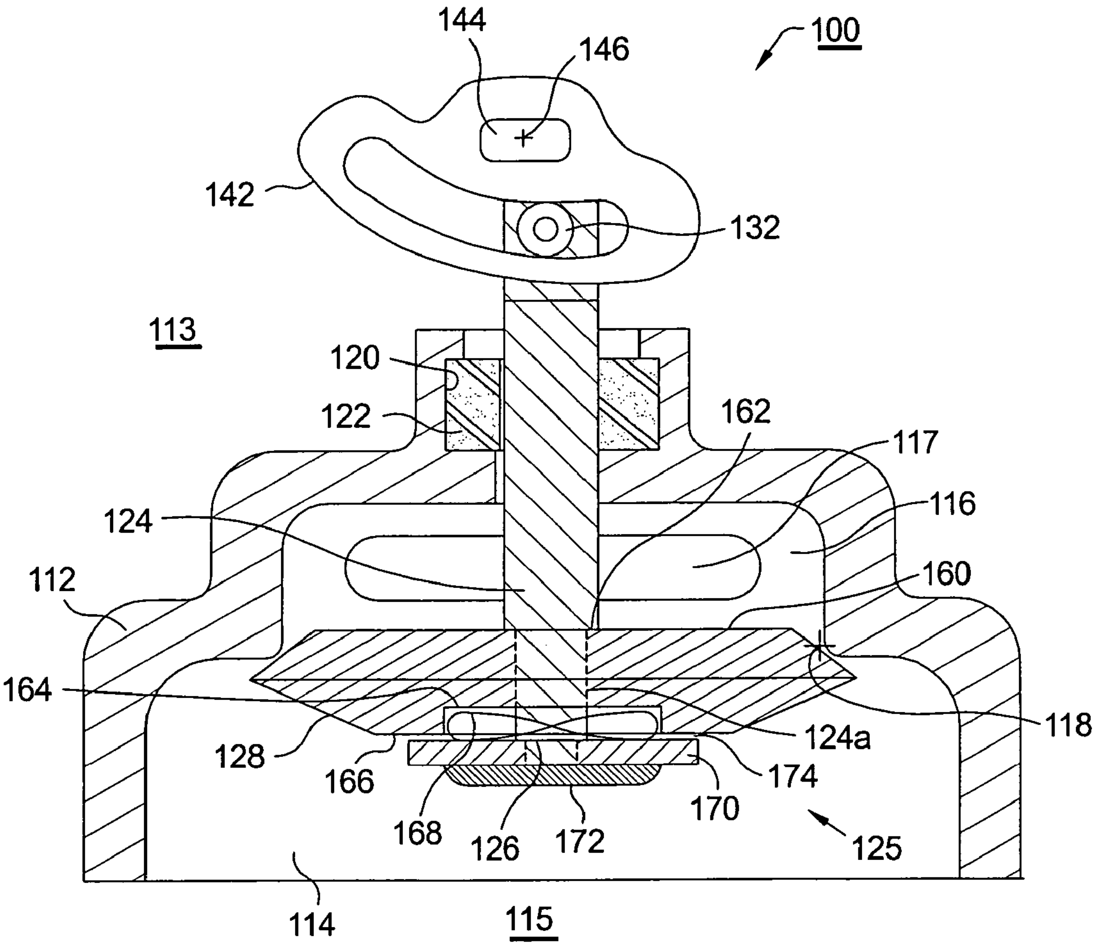
FIG. 3 is a schematic front elevational cross-sectional view of a first embodiment of a cam-actuated poppet valve in accordance with the invention.

Referring to FIG. 3, a first embodiment 100 of a, improved poppet valve assembly in accordance with the invention suitable for use as an EGR valve has elements recognizable from, and analogous to, similar elements in prior art valve 10. Not all such elements need be recited, however, but for those recited the corresponding reference numbers, plus 100, indicate corresponding parts. New parts are also in the 100 series at number 160 or greater.

A valve body 112 defines a first chamber 114 and a second chamber 116 separated by a valve seat 118. First chamber 114 may be in communication with an exhaust system 115 of an internal combustion engine 113, and second chamber 116 may be in communication with an intake system 117 of engine 113, or the reverse. A bore 120 in a wall of second chamber 116 is concentric with valve seat 118 and retains a bushing/seal 122 and a valve stem 124 of a poppet valve 125 slidably disposed in bushing/seal 122. Stem 124 extends through second chamber 116 and slidably engages at a first end 126 within body 112 a valve head 128 for variably mating with valve seat 118 to variably open and close valve assembly 100 between chambers 114,116 in response to axial motion of stem 124.

At a first surface 160 of valve head 128, stem 124 is stepped to provide a load surface 162 on surface 160 for opening the valve. A recess 164 is provided in second surface 166 for receiving a shock absorbing member, provided exemplarily in FIG. 3 as a wave washer 168 defining a circular spring having a spring constant in an axial direction. Preferably, wave washer 168 includes a central opening and is disposed in surrounding relationship to stepped portion 124*a* of stem 124. A retainer for wave washer 168 in recess 164 preferably includes a force plate 170 and a mushroom end 172 on stem portion 124*a*. The dimensions of head 128, stem 124, recess 164, and wave washer 168 are selected such that when valve head 128 makes closing contact with valve seat 118, as shown in FIG. 3, a gap 174 exists between force plate 170 and head surface 166. Wave washer 168 is minimally and sufficiently pre-compressed between force plate 170 and head 128 to prevent flutter of the head on the stem when the valve assembly is open. Further rotation of shaft 144 and cam plate 142 in a clockwise direction about axis 146, and corresponding sliding motion of portion 124*a* through valve head 128, serves to begin axial compression of wave washer 168. The spring characteristics of wave washer 168 are selected such that axial compression exerts force on valve head 128 sufficient to effect an adequate seal against seat 118 but insufficient to cause damage to components of the valve actuation train, including at least head 128, seat 118, roller 132, and cam plate 142. In a currently preferred embodiment, gap 174 is sufficiently large to permit over-rotation of shaft 146 of up to about 15 degrees.

Figure 4:
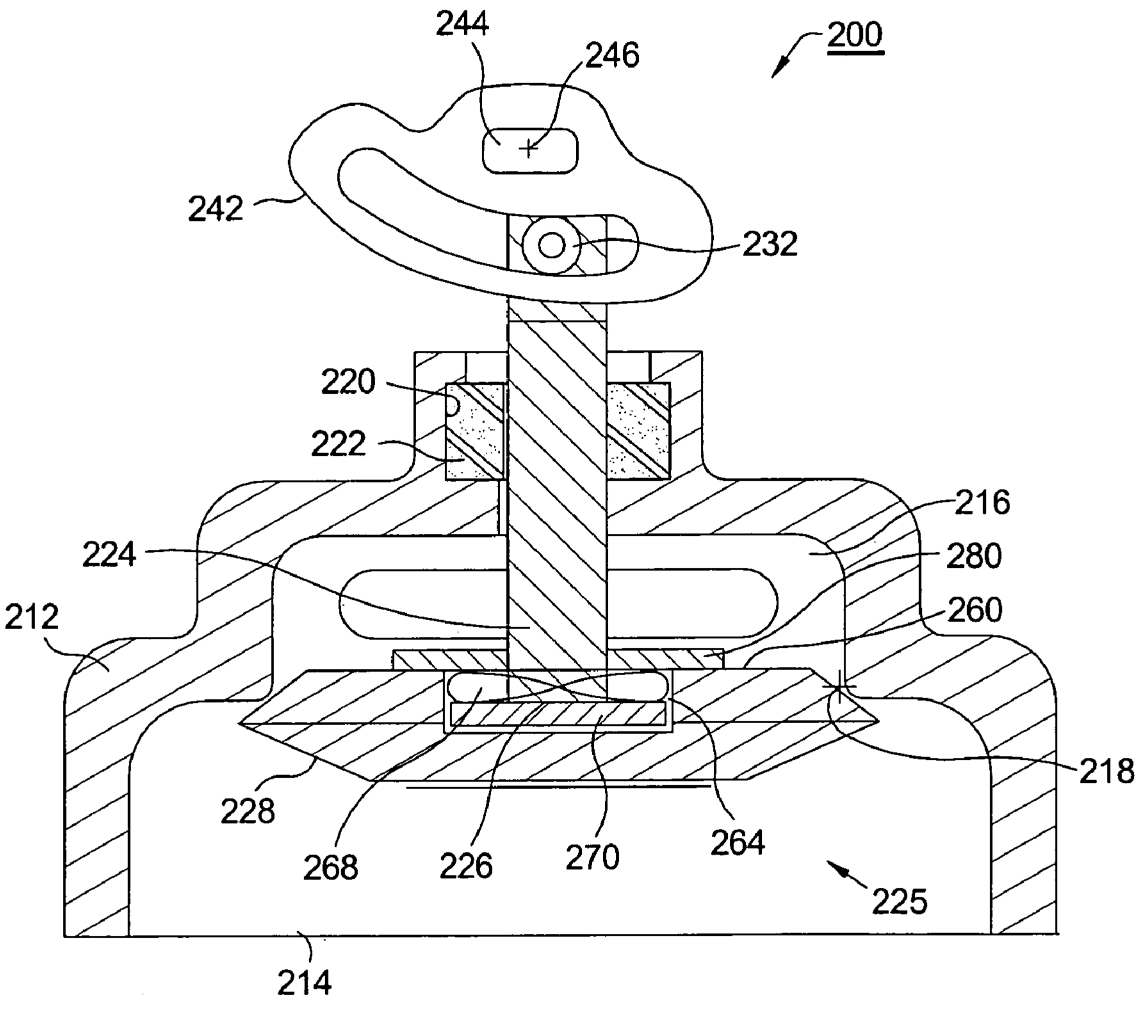
FIG. 4 is a schematic front elevational cross-sectional view of a second embodiment of a cam-actuated poppet valve in accordance with the invention.

Referring now to FIG. 4, a second embodiment 200 of an improved poppet valve assembly in accordance with the invention suitable for use as an EGR valve has elements recognizable from, and analogous to, similar elements in first embodiment 100. New parts are in the 200 series at number 280 or greater.

A valve body 212 defines a first chamber 214 and a second chamber 216 separated by a valve seat 218. A bore 220 in a wall of second chamber 216 is concentric with valve seat 218 and retains a bushing/seal 222 and a valve stem 224 of poppet valve 225 slidably disposed in bushing/seal 222. Stem 224 extends through second chamber 216 and engages at a first end 226 within body 212 a valve head 228 for variably mating with valve seat 218 to variably open and close valve assembly 200 between chambers 214,216 in response to axial motion of stem 224.

A recess 264 is provided in first valve head surface 260 for receiving a shock absorber, provided exemplarily in FIG. 4 as a wave washer 268 defining a circular spring having a spring constant in an axial direction. Preferably, wave washer 268 is disposed in surrounding relationship to stem 224. A retainer for wave washer 268 in recess 264 preferably includes a first force plate 270 mounted on stem 224. A second force plate 280 surrounds stem 224 and is mounted to valve head surface 260 by any suitable means such as, for example, by riveting, welding, mechanical deformation, etc., to capture wave washer 268, stem end 226, and first force plate 270 within recess 264. When valve head 228 makes closing contact with valve seat 218, as shown in FIG. 4, wave washer 268 is in a non-compressed condition. Further rotation of shaft 244 and cam plate 242 in a clockwise direction about axis 246 serves to urge first force plate to begin axial compression of wave washer 268 against second force plate 280. The spring characteristics of wave washer 268 are selected such that axial compression exerts force on second force plate 280, and thus on valve head 228, sufficient to effect an adequate seal against seat 218 but insufficient to cause damage to components of the valve actuation train, including at least head 228, seat 218, roller 232, and cam plate 242.

Second embodiment 200 is advantageous over first embodiment 100 in not having a potential leak path through the valve head past the valve stem; in embodiment 100, a close tolerance is required between the valve stem and the head bore to prevent leakage. However, a disadvantage of second embodiment 200 is that an additional component, second force plate 280, is required, adding a minimum of one component and requiring additional manufacturing steps for forming and attaching the second force plate to the valve head.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An internal combustion engine having an intake system and an exhaust system, the engine comprising an exhaust gas recirculation valve assembly for metering exhaust gas from said exhaust system into said intake system, wherein said exhaust gas recirculation valve assembly includes:

a) a valve body defining a first chamber in communication with one of said exhaust system and said intake system and a second chamber in communication with the other of said exhaust system and said intake system, wherein said first and second chambers are joined by a common port surrounded by a valve seat, said body further defining a first bore in a wall of one of said first and second chambers;

b) a poppet valve having a stem and a head, said stem being slidably disposed in said first bore and said head being selectively inatable with said seat to define a valve for regulating flow of material between said first and second chambers across said seat; and c) a shock-absorber disposed between said stem and said head to attenuate closing force of said valve, wherein said shock-absorber is mounted in surrounding relationship on said stem.

2. A poppet valve assembly comprising:

a) a valve body defining a chamber having an outlet defined by a port surrounded by a valve seat, said body further defining a first bore in a wall of said chamber;

b) a poppet valve having a stem and a head, said stem being slidably disposed in said first bore and said head being selectively matable with said seat to define a valve for regulating flow of material across said seat; and c) a shock-absorber disposed between said stem and said head to attenuate closing force of said valve, wherein said shock-absorber is mounted in surrounding relationship on said stem.

3. A poppet valve assembly in accordance with claim 2 further comprising a retainer for retaining said shock-absorber on said valve stem.

4. A poppet valve assembly in accordance with claim 2 wherein said shock-absorber is a wave washer.

5. A poppet valve assembly comprising:

a) a valve body defining a chamber having an outlet defined by a port surrounded by a valve seat, said body further defining a first bore in a wall of said chamber;

b) a poppet valve having a stem and a head, said stem being slidably disposed in said first bore and said head being selectively matable with said seat to define a valve for regulating flow of material across said seat; and c) a shock-absorber disposed between said stem and said head to attenuate closing force of said valve, wherein said shock-absorber is a wave washer mounted in surrounding relationship on said valve stem on a side of said valve head adjacent said first bore.

6. A poppet valve assembly in accordance with claim 5 further comprising a retainer for retaining said wave washer on said valve stem and a first plate for retaining said wave washer end said valve stem on said valve head such that said wave washer defines an axially-compressible element between said valve head and said valve stem.

7. A poppet valve assembly in accordance with claim 6 further comprising a second force plate fixedly mounted to said valve head.

8. A poppet valve assembly comprising:

a) a valve body defining a chamber having an outlet defined by a port surrounded by a valve seat, said body further defining a first bore in a wall of said chamber;

b) a poppet valve having a stem and a head, said stem being slidably disposed in said first bore and said head being selectively matable with said seat to define a valve for regulating flow of material across said seat;

c) an axial second bore through said valve bead for sliding passage of said valve stem;

d) a shock-absorber disposed between said stem and said head to attenuate closing force of said valve, wherein said shock absorber is a wave washer mounted in surrounding relationship on said valve stem on a side of said valve head opposite said first bore; and e) a retainer for retaining said wave washer on said valve stem.

9. A poppet valve assembly in accordance with claim 8 wherein said retainer includes a first force plate mounted on said valve stem adjacent said wave washer.

10. A poppet valve assembly in accordance with claim 9 further comprising a recess formed in said side of said valve head for receiving said wave washer.

11. A poppet valve assembly in accordance with claim 10 wherein said recess is formed to a depth in said head such that when said wave washer is disposed without axial compression within said recess said first force plate is off-spaced from said side of said valve head opposite said first bore.

12. A poppet valve assembly in accordance with claim 8 further comprising an actuator operable upon said valve stem for opening and closing said valve.

13. A poppet valve assembly in accordance with claim 12 wherein said actuator comprises:

a) a cam plate rotatable about an axis orthogonal to an axis of said valve stem, said cam plate having a slot comprising first and second substantially parallel sides formed in spiral relationship to said cam plate axis;

b) a roller rotatably disposed on said valve stem and positioned within said slot; and c) a driver for rotating said cam plate about said cam plate axis.

14. A poppet valve assembly in accordance with claim 13 wherein said driver is an electric motor.

15. An exhaust gas recirculation valve assembly for metering exhaust gas from an exhaust system into an intake system of an internal combustion engine, comprising:

a) a valve body defining a first chamber in communication with one of said exhaust system and said intake system and a second chamber in communication with the other of said exhaust system and said intake system, wherein said first and second chambers are joined by a common port surrounded by a valve seat, said body further defining a first bore in a wall of one of said first and second chambers;

b) a poppet valve having a stem and a head, said stem being slidably disposed in said first bore and said head being selectively matable with said seat to define a valve for regulating flow of material between said first and second chambers across said seat; and c) a shock-absorber disposed between said stem and said head to attenuate closing force of said valve, wherein said shock-absorber is mounted in surrounding relationship on said stem.

16. An exhaust gas recirculation valve assembly in accordance with claim 15 further comprising actuator means including:

a) a cam plate rotatable about an axis orthogonal to an axis of said valve stem, said cam plate having a slot comprising first and second substantially parallel sides formed in spiral relationship to said cam plate axis;

b) a roller rotatably disposed on said valve stem and positioned within said slot; and c) a driver for rotating said cam plate about said cam plate axis.

17. An exhaust gas recirculation valve assembly in accordance with claim 15 further comprising a retainer for retaining said shock-absorber on said valve stem.

18. An exhaust gas recirculation valve assembly in accordance with claim 15 wherein said shock-absorber is a wave washer.

19. An exhaust gas recirculation valve assembly in accordance with claim 15 wherein said shock-absorber comprises:

a) an axial second bore through said valve head for sliding passage of said valve stem;

b) a wave washer mounted in surrounding relationship on said valve stem on a side of said valve head opposite said first bore; and c) a first force plate mounted on said valve stem adjacent said wave washer.

20. An exhaust gas recirculation valve assembly in accordance with claim 19 further comprising a recess formed in said side of said valve head for receiving said wave washer.

* * * * *